UNITED STATES PATENT OFFICE.

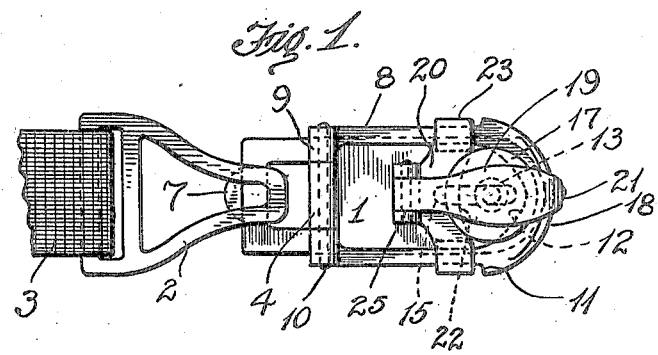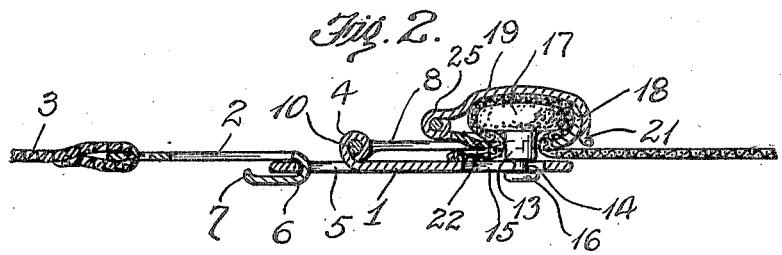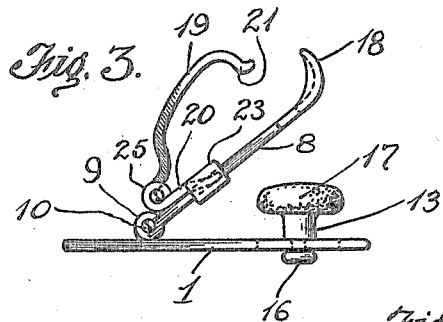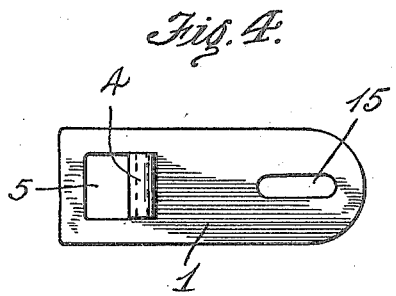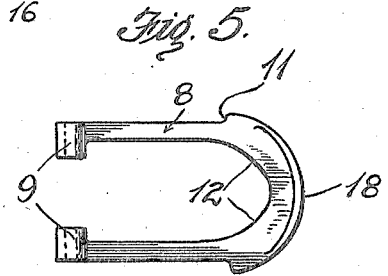

ELLA M. HITCHCOCK, OF LOS ANGELES, CALIFORNIA.

SUPPORTER-FASTENER.

1,273,369.　　　　Specification of Letters Patent.　　Patented July 23, 1918.

Application filed October 8, 1914. Serial No. 865,654.

*To all whom it may concern:*

Be it known that I, ELLA M. HITCHCOCK, a citizen of the United States, residing at Los Angeles, in the county of Los Angeles and State of California, have invented certain new and useful Improvements in Supporter-Fasteners, of which the following is a specification.

This invention relates to improvements in fasteners for hose supporters and has particular relation to the hose gripping clamp or clasp used with the ordinary pendant hose supporter whereby the supporter may be secured to hosiery in such a way to be practically locked thereon, and therefore not liable to accidentally loosen and become unclasped.

It is an object of the invention to provide a hose supporter fastener or clasp in which a hosiery engaging stud is provided over which a loop may be placed, a stud gripping member being also provided to securely hold the hosiery upon said stud.

It is also an object of the invention to provide a fastener for hose supporters in which an adjustable stud is mounted adjacent to a hosiery securing loop, and in which the loop for holding the hosiery on said stud is provided with a locking device for preventing the loop from becoming disengaged from the said stud.

It is a further object of the invention to provide a hose supporter with a detachable hosiery fastener or clasp which may be left upon the hosiery and disconnected from the supporter strap when not in use.

In the accompanying drawing forming a part of this specification:

Figure 1 is a front elevation of the improved fastener forming the subject of the present invention.

Fig. 2 is a longitudinal central sectional view through the said fastener, a piece of hosiery being shown left therein.

Fig. 3 is an edge elevation of the hose engaging portion of the device with the loop and clasp or locking device thereof shown in open positions.

Fig. 4 is a plan view of the base plate of the device.

Fig. 5 is a plan view of the loop member of the device separated from the base plate.

The device of the present invention is designed to provide a hose securing fastener for hose supporters which may be made to grip the fabric of the hose with a firm hold and yet without the necessity of pulling or wedging the said fabric into holding position as is common with many fasteners in use. The invention is also intended to provide a locking means for holding the fastener in hose engaging position so that it will not become accidentally unfastened and disengaged from the hosiery. The details and features of the invention will now be more specifically described reference being had to the accompanying drawing in which 1 indicates a base plate, 2 a hook member and 3 the strap or webbing of a hose supporter to which the said hook is secured, as by stitching or other fastening means.

The base plate 1 is usually struck from a single piece of metal and a tongue stamped from one end thereof is rolled to form an eye 4 to which the loop member of the device may be hinged. The aperture 5 left by the striking out of the said tongue is adapted to receive the hook 6 on the end of the hook member 2. The free end 7 of the hook 6 is preferably turned inwardly toward the body portion of the hook member to a slight degree, to prevent the hook from becoming disengaged from the base plate too easily.

Hinged upon the base plate 1 is a loop member 8 having pintle engaging eyes 9 adapted to fit at each end of the eye 4 so that when a pintle 10 or pivot pin is passed through the said eyes the loop member 8 will be hinged upon the plate 1. The free end of the said loop member 8 is rounded and made wider than the side bars of the loop so that limiting shoulders 11 may be provided thereon. The inner opening of the loop member is somewhat contracted at 12 so as to fit sufficiently close around the stem of the stud 13 to grip hose or other fabric thereon.

The said stud 13 is provided with a reduced portion 14 adapted to engage and move in a slot 15 which extends longitudinally of the base plate 1 but near the opposite end thereof from the aperture 5. The inner end of the stud is headed over sufficiently at 16 to prevent the stud from escaping from the slot, but enough play is permitted between the parts to allow the stud to slip back and forth in the said slot 15. The stud is provided with a hose engaging head 17 which is generally covered with suitable fabric or other holding means so that the hose will not slip thereon. By reason of the slot 15 the stud 13 can slip toward the hinged portion of the loop 8 where the opening in the loop is wide enough to receive the head 17 of the stud with the fabric of the stocking or other hose applied thereon. The loop 8 may then be folded downwardly over the head of the stud and the stud be slipped into the reduced end 12 of the opening in the loop for preventing its escape.

The outer end of the loop 8 is turned upwardly to form a catch or lock engaging flange 18. A catch or locking member 19 is carried upon the loop 8 by means of a transversely extending slide 20 and the said catch or lock member is bent at the end to form a holding portion 21 which may be sprung over the flange 18 to hold the catch or locking member over the stud 17. The slide 20 is also held with one edge under the head 17 where it has been drawn in fastening the catch or locking member 19. The edge of the said slide 20 is somewhat curved and slightly depressed at 22 where it fits beneath the head 17 and is thus admirably adapted to hold the fabric of the hose beneath the head 17 and around the inner side of the stud 13. The outer ends of the slide 20 are turned over to form loops 23 which receive the side portions of the loop member 8, sliding thereon. The said loop member is generally formed with shoulders at 11 as intimated to limit the movement of the said slide 20, upon the said loop member 8.

The catch or locking member 19 is elongated and usually of less width than the head 17 of the stud 13, and said catch is hinged at 25 to the central portion of the slide 20.

The operation of the device will be readily understood in connection with the above description. When the fastener is to be used, the catch 19 is released from its engagement with the flange 18, and the slide 20 carrying the same, is slipped back upon the side portions of the loop member 8. The stud 13 may then be moved opposite the wide portion of the opening in said loop member 8, which member may then be lifted from the stud and the head 17 thereof. The fabric of the hose is then placed over the head 17 and the loop 8 folded down upon the plate 1 so as to surround the stud. The stud 13 is then forced into the reduced end 12 of the loop 8 and the slide 20, is pushed forward against the stud 13 carrying the fabric with it. The catch or locking member 19 is then snapped into engagement with the flange 18 of the loop 8. The parts are thus secured locked in place, the loop member and the locking means preventing the stud from moving in either direction, and the fabric is firmly held entirely around the head of the stud, so that it is firmly held without the necessity of pulling or forcing the fabric to wedge it into narrow slots, openings or the like, to the detriment of the fabric. The hosiery is not liable to become disengaged from the supporter as frequently occurs with other devices in common use, as the catch or locking member positively holds the parts in proper position. In taking off the hosiery temporarily, the fabric need not always be removed from the clasping means since the plate 1 can be disengaged from the hook member 2 if desired. It will be observed that the minor details of the invention may be somewhat varied and mechanical equivalents thereof may be employed without departing in the least from the spirit and scope of this invention.

What is claimed is:

1. A fastener for hose supporters having a plate provided with a sliding stud, a loop adapted to receive said stud and hold the fabric of hosiery around the same, a slide member on said loop for further holding the fabric against said stud and a locking catch for holding the slide and engaging the loop on the other side of the stud.

2. A fabric engaging fastener comprising a plate, a stud adjustable longitudinally thereon and having an enlarged fabric engaging head, a loop carried by said plate and adapted to swing over said stud, said loop having a catch engaging flange, and a catch adjustably mounted on said loop and adapted to spring over the said catch engaging flange for locking the parts in fabric holding position.

3. A fabric engaging fastener comprising a stud carrying member having a fabric engaging stud thereon, a loop adapted to swing over said stud, a stud gripping slide movable on said loop and having a stud engaging depression formed therein, and a clasp hinged to said slide formed with a loop engaging hook at its free end, said clasp being adapted to extend over the said stud and engage the end of the said loop for locking the stud engaging portions of the loop and the slide beneath the head of the stud.

4. A supporter fastener comprising a plate adapted to be suspended from the supporter, a stud on said plate, a loop hinged on said plate and having reduced side portions and a clasp engaging flange at the end thereof, said loop also having limiting shoulders thereon, a slide adapted to move upon the reduced side portions of the loop and limited thereon by said shoulders, and a stud inclosing catch hinged upon said slide at one end and having a spring hook at the other end adapted to engage the flange at the end of the loop for locking the parts in fabric holding position.

In testimony whereof, I have hereunto set my hand, in presence of two witnesses.

ELLA M. HITCHCOCK.

Witnesses:
CASSELL SEVERANCE,
EARLE R. POLLARD.

Copies of this patent may be obtained for five cents each, by addressing the "Commissioner of Patents, Washington, D. C."